United States Patent [19]
Nishida et al.

[11] 3,861,797
[45] Jan. 21, 1975

[54] APPARATUS FOR OBTAINING COPIES EXPANDED OR CONSTRACTED IN ONE DIRECTION

[75] Inventors: Humihiko Nishida, Kyoto; Takeo Furutaka, Mino, both of Japan

[73] Assignees: Dainippon Screen Seiza Kabushiki-Kaisha, Kyoto, Japan; Dainippon Insatsu Kabushiki-Kaisha, Tokyo, Japan

[22] Filed: Apr. 18, 1973

[21] Appl. No.: 352,117

[30] Foreign Application Priority Data
Apr. 24, 1972  Japan................................ 47-41029
Feb. 6, 1973  Japan................................ 48-14283

[52] U.S. Cl. ..................................... 355/52, 355/99
[51] Int. Cl. ............................................ G03b 27/68
[58] Field of Search .................... 355/52, 99, 103, 2

[56] References Cited
UNITED STATES PATENTS
3,126,809  3/1964  Adams et al...................... 355/99 X
3,374,724  3/1968  Torres.............................. 355/52 X
3,767,301  10/1973  Solo..................................... 355/52

*Primary Examiner*—Richard A. Wintercorn
*Attorney, Agent, or Firm*—Marvin H. Kleinberg

[57] ABSTRACT

Apparatus is disclosed which is capable of changing the size of a two dimensional image in one dimension only by providing a linearly moving table with a linearly movable original holder carried by the table. An adjusting mechanism is provided to vary the magnitude of the motion of the original holder relative to the motion of the table.

11 Claims, 2 Drawing Figures

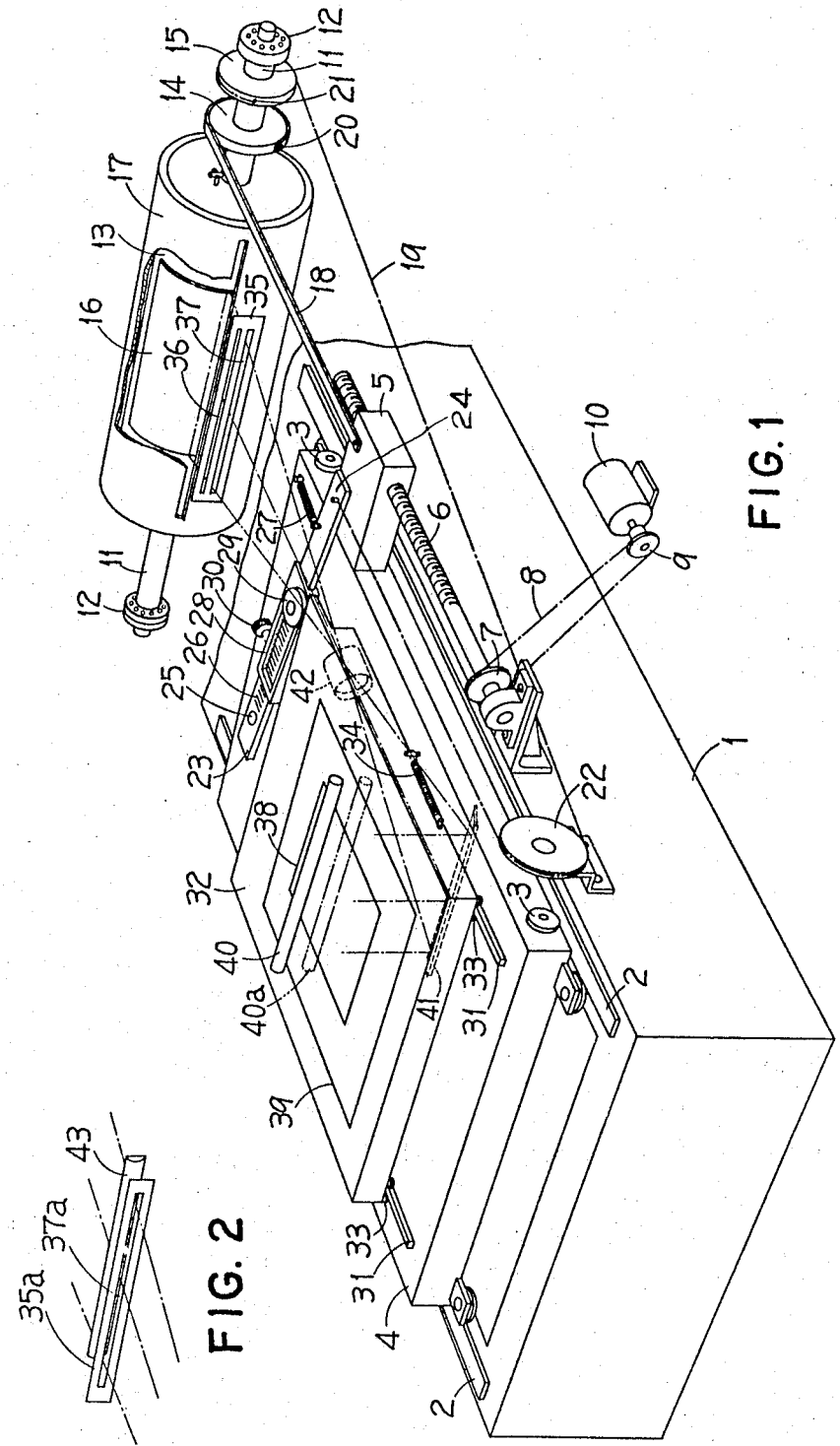

APPARATUS FOR OBTAINING COPIES EXPANDED OR CONSTRACTED IN ONE DIRECTION

This invention relates to an apparatus for obtaining duplicates from an original, said duplicates being same in size as the original only in one of the vertical and lateral directions and either elongated or contracted in the other direction.

Conventionally, the duplicates obtained from an original by using a copying machine, a process camera, or the like have been either same in size as the original or expanded or contracted in both vertical and lateral directions at a certain given ratio. However, it is often required in some specific circumstances to obtain duplicates which are of same size as the original only in one direction and either expanded or contracted in the other direction.

For instance, in rotary press printing, an original is usually printed to a printing plate in the form of a flat sheet. When the flat plate is fitted on the form cylinder of a rotary press, the plate is elongated (the amount of such elongation being usually equal to the product of the plate thickness and the circular constant) and, as a consequence, the obtained prints are elongated in the circumferential direction. In order to overcome such problems, it has been commonly practiced to first prepare an original in which the image has been contracted in the circumferential direction and then print such image to the plate. In a second approach the plate is attached around a printing cylinder having substantially the same diameter as the form cylinder, and the original is applied thereto. The printing is done from the original. In the final solution for preparing an original with contracted image, there is usually used a process camera provided with a deformation lens adapted to contract the image in one direction only. Alternatively a swinging of the camera is utilized for forming such one-direction contracted original. These means, however, have problems in poor operatibility, restriction to the size of the original usuable and inability to effect desired contraction at an exact rate. In the second solution, as there are many types of plates, it requires the preparation of printing cylinders of different diameters to match such variety of plates, resulting in substantially reduced versatility.

The present invention is to provide a novel copying apparatus which is freed of the above-mentioned defects of the conventional devices, and it is now described in detail with reference to the accompanying drawings, in which FIG. 1 illustrates schematically in perspective an embodied form of the present invention, and FIG. 2 shows a modification of a part of the apparatus of FIG. 1.

In the drawings, reference numeral 1 denotes a machine frame, along both end portions on the upper surface of which machine frame are formed a pair of parallel rails 2. Movably mounted on the rails 2 by rollers 3 is a carriage 4. A nut member 5 is projected from a side of the carriage 4 for engagement with a threaded rod 6 having a pulley 7 secured at one end thereof. The pulley 7 is connected by means of a belt 8 to another pulley 9 secured to the shaft of a motor 10.

An elongated shaft 11 is journalled to bearings 12 mounted at parts of the machine frame 1, and on said elongated shaft are fixedly mounted a cylinder 13 and pulleys 14 and 15, with a sensitive film 16 being attached to the surface of the cylinder 13. Numeral 17 refers to a film magazine.

An end of the belt 18 and 19 is riveted to peripheral points of the pulleys 14 and 15, respectively. The belt 18 is wound round the pulley 14 in a counter-clockwise direction in FIG. 1 from its riveted point 20, extending and anchoring the other end of the belt 18 to the nut member 5 thus, constituting a "pinned-web" arrangement. The other belt 19 is similarly "pinned," being wound round the pulley 15 in the direction opposite to the first belt 18, or in a clockwise direction in FIG. 1 from its riveted point 21, and then extended out forwardly to run around a pulley 22 for anchoring the other end of belt 19 to a lever 23 at end 24. The lever 23 is pivoted at its middle portion to the upper face of the carriage 4 by means of a vertical shaft 25.

On the upper surface of the lever 23 is marked scale 26. A tension spring 27 is arranged between the carriage 4 and the lever 23, pulling the lever in one direction against the tension of belt 19. Slidably fitted to the lever 23 is a cursor 28 which is provided on the upper face thereof with a roller 29 arranged to be rotatable about a vertical shaft. The cursor 28 may be fixed to the lever 23 by means of a set screw 30.

Along both sides of and on the upper surface of the carriage 4, a pair of guide rails 31 are provided in parallel to the rails 2, bearing an original holder 32 in such a manner that the original holder may be wheeled along the rails 31 by means of rollers 33. Provided between a side of the original holder 32 and the carriage 4 is a spring 34, biasing the original holder to engage with the roller 29 on cursor 28.

Disposed in front of and parallel to the axis of the cylinder 13 is a vertical plate 35 having several horizontal slits 36 and 37 of different slit width to one another.

Numeral 38 refers to an original placed on a glass plate 39 laid on the original holder 32, and a light source 40 is disposed immediately above the original 38. The light source 40 is designed to give an optical path that passes through the image (including letter and/or sign image) on the original 38 and then is reflected by a mirror 41 to reach the sensitive film 16 on the cylinder 13 through a lens 42 and one of the slits 36 or 37. It is possible to use a reflective light source 40a such as shown by dashed and dotted lines. The slit plate 35 intercepts the reflection from the original 38, allowing only that part of the reflection which has passed through the slit 36 or 37 to be projected on the sensitive film 16. However, since the cylinder 13 is rotating slowing, the reflection on the film 16 moves successively along the surface of said film and hence is sensitized as a continuous image on the film. Thus, the size of the slits 36 and 37 is an important factor for deciding the amount of exposure, and therefore such size of the slits is selected aptly in accordance with the pattern of exposure effected.

As will be understood from the foregoing description of the arrangement, when the motor 10 is driven, its driving force is transmitted through the pulley 9, belt 8, pulley 7, threaded rod 6 and nut member 5 to the carriage 4 to let the carriage move slowly, and at the same time, the driving force is also transmitted through the belt 18 secured to the nut member 5 and further through the pulley 14 to the elongated shaft 11 to let the shaft rotate. As this elongated shaft 11 is rotated, the cylinder 13 is also caused to rotate and its motion is transmitted through the pulley 15 and belt 19 to the lever 23 to let the lever turn about the vertical shaft 25. This also causes the roller 29 secured to the cursor 28 to rotate, causing the original holder 32 to move slowly. It will therefore be understood that the original 38 on the holder 32 is caused to move at the combined velocity of the holder velocity and carriage velocity, this constituting a two-component, or compound, motion along the common direction. The light from the light source 40 transmits through the original 38 and is reflected by the mirror 41 to pass through the lens 42 and slit 36 or 37 to expose the film attached on the cylinder 13. The projected image varies gradually with movement of the original holder 32, but since the cylinder 13 is rotating constantly, the image-projected position on the film surface through the slit 36 or 37 is also gradually changed, and hence if the moving velocity of the original 38 is same as the peripheral velocity of the film 16, there is obtained on said film a reflection that coincides with the image on the original 38. Also, if the moving velocity of the original 38 is slowed by adjusting the cursor 28 according to the scale 26, with the amount of exposure being also adjusted accordingly, the image (including letters) in the original 38 is reflected on the film 16 in the form of an enlarged image elongated in the direction of movement of the image. Likewise, if the original moving velocity is increased, the image in the original 38 is projected on the film 16 as a reduced image contracted in the direction of movement. Thus, the image printed from said sensitized film is manifested as an image which is either expanded or contracted in one direction as compared with the image in the original.

As described above, according to the present invention having the above-mentioned arrangement and action, it is possible to obtain a copied image which is either expanded or contracted in a desired direction from an original with a very simple operation of merely adjusting the cursor 28. Also, the rate of such expansion or contraction can be maintained correctly throughout the operation, ensuring highly improved workability. Further, the mechanism of the apparatus is very simple and easy to operate.

As a modification, a second lens may be positioned at the slit plate. FIG. 2 illustrates that the second lens 43 is disposed between the cylinder 13 and the slit plate 35a which has a single slit 37a of proper slit width. The lens 43 can accelerate the rate of exposure with an improved resolving power. The lens 43 may also be used to increase the rate of enlargement or contraction of the image. It is further possible to omit the slit plate when the lens 43 is used.

We claim:

1. A copying appratus for obtaining copied images either expanded or contracted in one direction, including an original moving mechanism for moving an original at a desired velocity along a virtual straight line within a plane including said original, and a cylinder carrying a sensitive film around its peripheral surface and adapted to rotate about an axis, said moving mechanism and said cylinder being operatively connected through a mechanism adapted to allow adjustment of the ratio between the moving velocity of said original to the peripheral velocity of the sensitive film on said cylinder, and further characterized in that slits for allowing projection of the image of the original onto the sensitive film on said cylinder as a small-sized partial reflection are provided in parallel to the axis of rotation of said cylinder and spaced apart at a predetermined distance from the peripheral surface of said cylinder.

2. A copying apparatus for obtaining copied images which are changed in scale in only one dimension comprising:
   1. a bed for carrying the copying apparatus;
   2. a first movable table attached to said bed and linearly movable with respect thereto, adapted to transport an original document relative to an image plane, in a first linear direction;
   3. a second movable table, attached to said first movable table, being superposed thereon, carrying said document to be linearly movable with respect thereto in said first linear direction;
   4. scanning means for applying the image of an original document to a remotely located sensitive medium in synchronism with the motion of said first table; and
   5. adjustable scaling means coupled to said scanning means and said second movable table for imparting linear motion to said second table during movement of said first table,
   whereby the net motion of the original document relative to said bed, varies the scale of the image at the sensitive medium in one direction.

3. The copying apparatus of claim 2, above wherein said scanning means include means for transporting the sensitive medium past an imaging area and optical means for transmitting the optical image of the original document to the imaging area.

4. The copying apparatus of claim 2, above wherein said scaling means include a lever arm pivotally mounted to one end of said first table and including a cursor carrying a post for contacting an end of said second table, said lever being coupled to said scanning means, whereby the position of said cursor relative to said pivotal mounting determines the linear motion applied to said second table.

5. In a copy apparatus adapted for rendering a selectably-distortable copy image from a prescribed original medium on a prescribed copy medium, with distortion adapted to selectively expand or contract the image to a prescribed selectable degree in one direction, and wherein said apparatus includes a frame, a first carrier table arranged on said frame to be transported rectilinearly along a first direction with respect to said frame to translate said original medium, scan means for manipulating said copy medium and projecting incremental portions of said image from the original thereto in synchronism with the movement of the carrier said copy medium being disposed on a copy substrate positioned remotely from said table; optical means coupling the image from said table to said copy substrate; the combination therewith comprising:
   a second carrier adapted to carry said original medium and mounted superposed and movably on said first carrier to be carried and translated thereby while also being linearly movable in said direction with respect thereto; and
   adjustable scaling means coupled between said scan means and said second carrier and adapted to drive said second carrier relative to said first carrier so as to impart a two-component for said original along said first direction; the scan means further being adjustable so as to selectively vary the relative motion of said first and second carriers.

6. The combination as recited in claim 5 wherein said scaling means comprises a lever arm pivotably mounted on said first carrier and including position-adjustable coupling means carried on said arm and adapted to be selectably translated therealong, said coupling means including a contact member adapted to couple said lever arm to an end of said second carrier whereby to impart motion thereto relative to said first carrier; said lever arm further being coupled to said scan means to be pivoted synchronous with movement thereof whereby adjustment of the position of said contact member along the arm relative to its pivot point can selectively determine the speed of said second carrier relative to said first carrier.

7. The combination as recited in claim 5 wherein said scan means comprises a cylindrical transport means adapted to carry said copy medium wrapped about at least a portion of its periphery and adapted to rotate the copy medium about a rotational axis relatively transverse said first direction; drive means arranged to translate one of said first carrier and said cylindrical transport means at a prescribed surface speed; and linear aperture means arranged to intersect the optical path between said media and dimensioned so as to control exposure of the copy medium in a prescribed manner when the original image is illuminated and projected theretoward;

and wherein said cylindrical transport means and first carrier are intercoupled with linkage means to translate one synchronously with movement of the other.

8. The combination as recited in claim 7 wherein said first carrier comprises a table coupled to the drive means by a lead screw arrangement which is, in turn, coupled to rotate said cylindrical transport means through a "pinned-web" linkage.

9. The combination as recited in claim 8 wherein a lever of said scale means is coupled to be synchronously pivoted with rotation of said cylindrical transport means through a "pinned-web" linkage.

10. The combination as recited in claim 9 wherein said aperture means comprises a plurality of exposure slits of different widths each fashioned to provide a prescribed exposure, said slits being adapted to allow projection of the image onto said copy media and being spaced a predetermined distance from one another and from the periphery of said cylindrical transport means.

11. The combination as recited in claim 5 wherein said scaling means comprises a coupling lever pivotably mounted on said first carrier and including a contact means carried thereon and adapted to couple said lever to said second carrier, said contact means being position-adjustable along said lever so as to provide adjustable scaling and control of relative carrier speeds according to the arm-length at which it is set.

* * * * *